United States Patent [19]

Mohr et al.

[11] 3,739,751
[45] June 19, 1973

[54] RESTRAINER AND METABOLISM CAGE FOR TEST ANIMALS

[76] Inventors: Theo Richard Mohr, Max Planck Strasse 13, Leopoldshafen; Vladimir Volf, Kolbergerstrasse 10c, Karlsruhe, both of Germany

[22] Filed: May 3, 1971

[21] Appl. No.: 139,668

[30] Foreign Application Priority Data
July 8, 1970 Germany.................. P 20 33 717.1

[52] U.S. Cl. ............................................... 119/103
[51] Int. Cl. ............................................. A61d 3/00
[58] Field of Search......................... 119/15, 96, 103

[56] References Cited
UNITED STATES PATENTS
2,987,042  6/1961  Rothberg........................... 119/103
3,094,101  6/1963  Porter................................ 119/103
3,474,763  10/1969  Kissil et al. ....................... 119/103
3,625,185  12/1971  Kester............................... 119/103 X Primary Examiner—Hugh R. Chamblee
Attorney—Spencer & Kaye

[57] ABSTRACT

A cage for restraining an animal, in order to enable collection of the catabolites of the animal, including two sections which are interconnected so as to form a holder having a cylindrical inner cavity, the size of which is adjustable. Both of the sections are made from non-metallic, non-corrosive materials which can be easily decontaminated. The size of the the cavity is adjustable to tightly confine the animal within the space. A rear plate bears against the hind end of the animal and has an opening for the passage of the animal feces, which fall into a beaker located immediately behind the opening. An additional vessel is movable into the cage from underneath the animal in order to be pressed against the animal for the purposes of collecting urine samples.

11 Claims, 1 Drawing Figure

Patented June 19, 1973 3,739,751
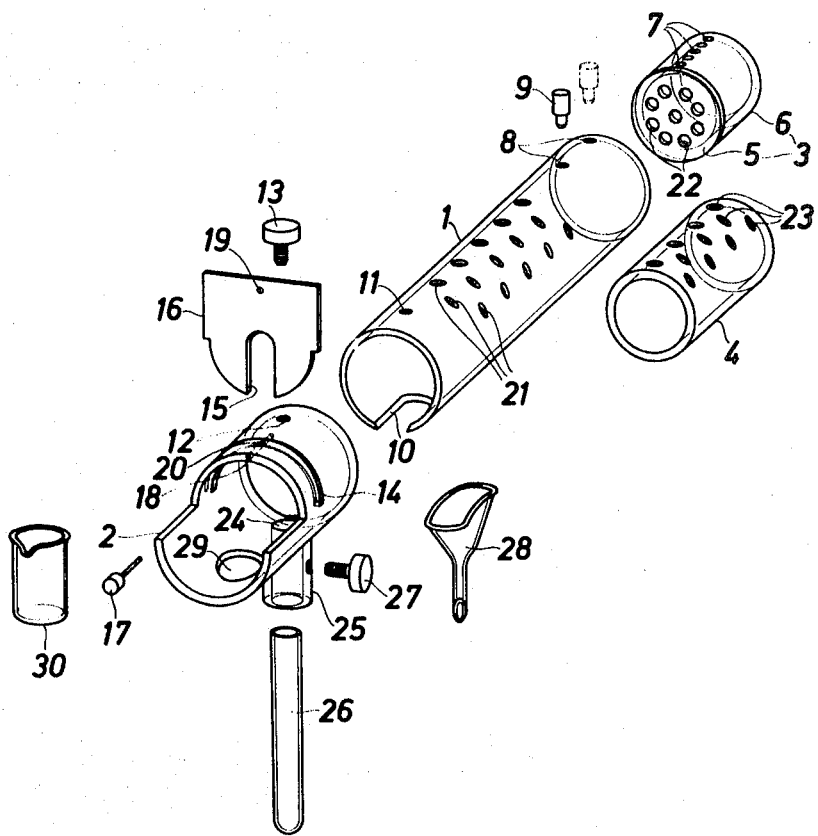
Inventors:
Theo Richard Mohr
Vladimir Volf
By: Spencer & Kaye
Attorneys

RESTRAINER AND METABOLISM CAGE FOR TEST ANIMALS

The invention relates to a restrainer and metabolism cage composed of several parts and consisting, at least partly, of non-metallic, non-corrosive material which can be decontaminated, destined for the restraint and observation of test animals and the separate collection of catabolites of such animals in two separate, exchangeable collection vessels for the catabolites urine and feces, and with at least one adjustable component for adaptation of the interior space of the cage to the test animals.

Restrainer cages for test animals, especially for rats and other small animals, are required whenever a relative immobilization of these animals is to be safeguarded, e.g., in serial treatments with injections etc. Simple holding devices for strapping the animals on to operative boards are mostly insufficient for immobilization because from time to time the animals attempt to free themselves. Moreover, there is the hazard of disturbed circulation, at least locally, in such tied or clamped parts of the body. For treatments taking more than a few minutes, more cautions restraining in a restraint cage is therefore indicated; a cage of this kind guarantees simpler handling and protects against bites and scratches.

Metabolism cages are used for collection of catabolites whose investigation is of decisive importance for the evaluation, e.g., of pharmacological experiments of balance tests.

Most of the familiar cages for test animals used for the investigations described above are either restrainer or metabolism cages only. S.A. Miller et al. describe a metabolism cage which permits the separate collection of urine and feces and minimizes pollution of these catabolites, if it does not entirely avoid it [S.A. Miller, H.A. Dymsza, A. Cornell, A.M. Gauthier: Toxicology and Applied Pharmacology 3 (1961), pp. 25–30]. This cage consists of a number of stainless steel components some of which are provided with a wire mesh. The animals can be observed throughout the test. A curved wire mesh separates urine and feces. It directs the fecal matter dropping down from the interior of the cage through the bottom of the cage which is also made of wire mesh, to the side of the collection pans for fecal matter. Urine drips from the bottom of the cage onto the curved wire mesh and from here into the inclined urine collection pan which is equipped with a drain tube.

Depending upon the purpose of the investigations, such a cage will not satisfy the necessary requirements. Already the collection of urine may be insufficient with respect to quantity and composition if the relatively long path over the wire meshes into the collection pan causes urine droplets to stick and dry up, which process may be favored by the temperature and the ventilation of the room. Moreover, fecal matter may become polluted with urine if it contacts urine droplets which adhering to the wire mesh. This may completely falsify and render useless results of investigations relating to the quantitative assessment and distribution of substances administered to an animal in advance, e.g., drugs or radioactively labeled compounds. A restrainer and metabolism cage for rats which can be combined partly of stainless steel components and partly of plexiglass components is distributed under the trade name of "Restrainer Rack, Model BR–350" by the U.S. company Aerospace Industries Inc., Garnerville, N.Y.

In that cage also urine and feces are collected separately in two plastic bottles set up in a stainless steel containment vessel. This vessel is located below the cage, which is installed in a stainless steel rack. The test animal is restrained in the interior space of the cage longitudinally by a front wall which can be inserted through slots in the bottom of the cage. The hindlegs are led through cutouts in both sidewalls and placed on ramps of the stainless steel rack extending along the sides of the cage. The hindlegs are clamped by means of two adjusting plates set up against the sidewalls of the cage from the interior which plates are held by the cover plate of the cage the height of which can be varied. The tail of the test animal is led through an orifice used as the rear boundary wall and is clamped also. The urine of a rat whose movements are restrained in this way drips through an opening in the bottom of the cage onto a groove attached to the lower side of the bottom and flows into the plastic bottle. Feces are dropped directly into the other plastic bottle. In general, clamping of the hindlegs and the tail causes a traumatic shock to the rat. Moreover, a test animal may hurt the clamped parts of the body in such cage. In that case a potential pollution of the urine by blood cannot be excluded. Also the possibility of small amounts of urine drying in the groove cannot be excluded completely. Owing to the design of the cage, disassembly of the cage into its component parts and cleaning of these components, but especially the reassembly during introduction of a test animal is rather cumbersome and time consuming.

Moreover, restrainer cages with adjustable front walls are known, but in these cages the test animals can turn around their longitudinal axis, which will render any collection of catabolites either impossible or at least incomplete.

SUMMARY OF THE INVENTION

Now, the invention is based on the problem of creating a restrainer and metabolism cage for test animals which safeguards a quantitative and separate collection of the pure catabolites urine and feces while guaranteeing careful restraint of the animals. The cage is to be non-corrosive and easy to decontaminate.

In the invention, this problem is solved by making the interior space of the cage cylindrical and having at least one of the two collection vessels projecting into the interior space and equipping it with a funnel.

In another embodiment of the invention the collection vessel for urine projects into the interior space, is fitted into a penetration in the bottom of the cage and installed so as to be radially adjustable. The collection vessel for feces is fitted into another penetration in the bottom of the cage. The cage according to the invention most advantageously consists of an at least partly perforated tube, a metabolism section attached to one end of this tube and having penetrations for accommodating the collection vessels, collection vessels for urine and feces, and at least one adapter section installed at the other end of the tube so as to be adjustable and exchangeable. All edges and openings of this cage are rounded off. The tube is perforated on the side and the top and has a notch in the bottom side of the end facing the metabolism section and a threaded bore on the upper side for fixing the metabolism section. The end of the metabolism section carrying the urine collection vessel is designed so that it can be slid over the cage tube, has a penetration in its bottom side with a connecting tube and a locking screw for accommodation of the urine collection vessel, and another penetration for accommodating the feces collection vessel. At its upper part, the metabolism section is equipped with a threaded bore with a screw for fixing the metabolism section and with a slot and an orifice plate, which can be arrested in it by means of a lock pin, with a cutout as the rear boundary wall of the interior space of the cage. The adapter section consists of a perforated disk with a guide tube attached to it with the disk and the guide tube having an outside diameter which corresponds to the inside diameter of the cage tube. On its upper side, the guide tube has a number of penetrations for accommodation of a guide pin connecting the cage tube and the adapter section which can be moved in it. This adapter section is used as an adjustable front wall limiting the interior space. For further reduction of the interior space the cage tube has another exchangeable tubular and perforated adapter section.

In a particularly advantageous embodiment of the invention the adapter sections, the cage tube and the metabolism section consist chiefly of plexiglass tubes which can be slid over each other, set screws and guide pins of plastics, the urine collection vessel is a rimless test tube connected with a detachable oval funnel, and the feces collection vessel is a beaker.

One particular advantage of the cage according to the invention is the cylindrical design of the interior space. This cylindrical shape corresponds to the most favorable physiological conditions for test animals, e.g., rats, and simulates a run to a burrow of animals living in freedom in nature. If the cage tube is darkened by a piece of cloth put over it before a test animal is introduced into the cage, a rat held by the tail by the scientist will spontaneously run into the tube. Another major advantage is the fact that a collection vessel equipped with a funnel projects into the interior space; this results in a relative immobilization of the animal together with a complete separation of the catabolites urine and feces and a prevention of pollution of these excreta. The urine collection vessel, which is so installed as to be adjustable, with the oval funnel is moved up to the abdomen of the test animal, which prevents loss of urine with both male and female animals. The collection is made quantitatively. Any turning of the animal around its longitudinal axis is impossible in this cage because the collection vessel with the funnel protrudes into the interior space. The cylindrical shape of the interior space and the urine collection vessel protruding into the interior space also have the result that after not more than one training of a rat prior to the beginning of the experiment (i.e., a few hours of restraint without collection of the catabolites and prior to administering a test substance) the restraint of the animal establish largely normal conditions of the rates and composition of the excreta. This means that the control excreta (Control excreta in this case means the normal excreta of untreated rats.) obtained in the cage are largely similar to the excreta of rats living in freedom with respect to composition and quantity. In this way, it has been safeguarded for the first time that investigations relating to deviations from control excreta always have the same quality and content of information. Moreover, this cautious restraint avoids any stress caused by clamping or tying any parts of the body of a test animal.

As is known, stresses also can result in a change in the catabolites and make test results useless, even if there are not yet any lesions and disturbances of circulation.

In order to test the effect of restraint in the cage according to the invention upon the composition of the catabolites of rats the excreta were examined for their content of sodium, potassium, magnesium and zinc [P. Dvořák: Strahlentherapie (1970) in the press]. The test animals were restrained for this purpose for a period of 24 hours every second or third day, i.e., a total of four times. Only after the first restraint the sodium content of the excreta was markedly lower while, in comparison of the respective results after the second to fourth restraints, it reached a satisfactory degree of constancy. This means that one training of a rat is sufficient to make it get accustomed to restraint in this cage in such a way that no useless results must be anticipated from the second restraint onward.

This is important especially if rates of excretion and balances of radionuclides are of decisive significance for the investigations. Hence, the cage according to the invention allows by far more accurate test results and thus a better evaluation of the results.

Owing to its simple design, the new restrainer and metabolism cage can be used with various adapter sections for a wide range of sizes of test animals, e.g., for rats of 100 to 500 g. All the disadvantages so far known from earlier cage designs are avoided in the cage according to the invention. The urine collection vessel can be exchanged during the experiment. After the end of the experiment the entire metabolism section can be detached by unscrewing one bolt. A larger number of these cages can be put individually on a rack consisting, e.g., of plexiglass.

BRIEF DESCRIPTION OF THE DRAWING

The FIGURE shows an advantageous embodiment of the invention and shows a perspective schematic exploded view of the components of the cage.

DESCRIPTION OF THE PREFERRED EMBODIMENT

The cage according to the diagram consists of a partially perforated plexiglass tube 1, a metabolism section 2, an adapter section 3 which acts as the front wall and can be adjusted, and an exchangeable tubular adapter section 4. The adapter section 3 consists of a perforated disk 5 with a guide tube 6 the top side of which carries a number of perforations 7. At one end, the top side of tube 1 carries bores 8. A plastic guide pin 9 permits the adaptation of the interior space of tube 1 to the size of the test animal by introduction of the guide pin into a corresponding combination of bore 8 each with a bore 7 of the adapter section 3 adjustable within the tube 1. At the other end the tube 1 has a notch 10 on the bottom side and a threaded bore 11 on the upper side. With the cage assembled, a part of the mainly tubular metabolism section 2 is slid over this end with the threaded bore 12 on its upper side placed on top of the threaded bore 11. A plastic bolt 13 connects the two bores and thus tube 1 with the metabolism section 2. The upper side of the latter carries a slot 14 into which an orifice plate 16 provided with a notch 15 is inserted as the rear boundary of the inner cage space and is retained by a plastic guide pin 17 inserted into the bores 18, 19, 20. The tail of the test animal is led through the notch 15. The perforations 21, 22, 23 in tube 1 and in the adapter sections 3 and 4 serve for ventilation of the cage.

On the bottom side of the end facing the tube 1 the metabolism section 2 has a penetration 24 to which a connecting tube 25 is attached for accommodation of a test tube 26 employed as a urine collection vessel.

The connecting tube 25 is equipped with a locking screw 27. The test tube 26 carries a small oval glass funnel 28. The test tube 26 with the funnel 28 can be radially displaced in the interior space of the cage by means of the connecting tube 25 and the locking screw 27 and can be moved directly underneath the point of urine exit of the body of the animal, which makes for a cautious restraint of the movements. Another penetration 29 in the bottom side of the metabolism cage 2 accommodates a small beaker 30 as a collection vessel for feces.

What we claim is:

1. A restrainer and metabolism cage for the restraint and observation of a test animal and the independent collection of catabolites for such animal, said cage comprising: holder means for holding the animal to be tested, said holder means including two sections, each composed of a non-metallic, non-corrosive material which can be decontaminated, said two sections having cylindrical inner surfaces and being assembled together to define a cylindrical interior cavity, said two sections being adjustable with respect to each other along the longitudinal axis of said holder means for adapting the size of said cavity to the size of the test animal; and two collection vessels replaceably arranged in communication with said holder means so as to separately collect the urine and feces catabolites of the test animal; one of said vessels including a funnel mounted to be movable into a position where it protrudes into said cavity.

2. A restrainer and metabolism cage as defined in claim 1 wherein the bottom of said holder means has a penetration and said vessel protruding into said cavity is the vessel for collecting urine and is fitted into said penetration.

3. A restrainer and metabolism cage as defined in claim 1 wherein said vessel protruding into said cavity is the vessel for collecting urine and is radially extendable into said cavity.

4. A restrainer and metabolism cage as defined in claim 1 wherein the bottom of said holder means has a penetration and said vessel for collecting the feces is fitted into said penetration.

5. A restrainer and metabolism cage as defined in claim 1 wherein a first of said two sections has perforations through its surface, a second of said two sections is attached to one end of said first section so as to be adjustable and exchangeable with respect to said first section, the edges and openings of said holder means are rounded off, and said holder means further comprises a metabolism section attachable to the end of said first section opposite said second section and having a first and a second penetration for separately accommodating each of said collection vessels.

6. A restrainer and metabolism cage as defined in claim 5 wherein said perforations in said first section are located on the side and top of said first section, the bottom of said first section on the end facing said metabolism section having a notch and the top of said first section having a threaded bore therein for receiving a screw for fixing said metabolism section to said first section.

7. A restrainer and metabolism cage as defined in claim 5 wherein said metabolism section is designed so as to be capable of being slidably mounted onto said first section, and having a threaded bore on its top arranged to receive a screw for fixing said metabolism section in place on said first section, said metabolism section having a slot in its surface, said first penetration being on the end of said metabolism section adjacent said first section, and said feces collection vessel being attached to said second penetration, and further comprising: a connecting tube attached to said first penetration and having a locking screw set therein for connecting said urine collection vessel to said first penetration; and an orifice plate adapted to be fitted into said slot and to be fixed therein by means of a guide pin so as to form a rear wall of said cavity, said orifice plate having a cutout therein.

8. A restrainer and metabolism cage as defined in claim 5 wherein said second section includes a perforated disk and a guide tube attached to said disk, the external diameters of said disk and said guide tube correspond to the inside diameter of said first section, and the top side of said guide tube has a plurality of longitudinally arranged penetrations for accommodation of a guide pin for adjustably connecting said second section with said first section.

9. A restrainer and metabolism cage as defined in claim 5 wherein said holder means further comprises: an additional section adapted to be arranged within said first section for reducing the size of said cavity.

10. A restrainer and metabolism cage as defined in claim 5 wherein said first and second sections and said metabolism section are made substantially of plexiglass and are adapted to be slidably connectable.

11. A restrainer and metabolism cage as defined in claim 7 wherein said locking screw and said guide pin are both made of plastic, said urine collection vessel is a rimless test tube with a detachably connected oval funnel and said feces collection vessel is a beaker.

* * * * *